United States Patent
Cho et al.

(10) Patent No.: US 10,037,376 B2
(45) Date of Patent: Jul. 31, 2018

(54) THROUGHPUT-BASED FAN-OUT CONTROL IN SCALABLE DISTRIBUTED DATA STORES

(71) Applicant: LinkedIn Corporation, Mountain View, CA (US)

(72) Inventors: SungJu Cho, Cupertino, CA (US); Andrew J. Carter, Mountain View, CA (US); Joshua D. Ehrlich, Mountain View, CA (US); Jane Alam Jan, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 15/096,067

(22) Filed: Apr. 11, 2016

(65) Prior Publication Data
US 2017/0262524 A1    Sep. 14, 2017

Related U.S. Application Data

(60) Provisional application No. 62/307,025, filed on Mar. 11, 2016.

(51) Int. Cl.
*G06F 7/00* (2006.01)
*G06F 17/30* (2006.01)
*H04L 12/715* (2013.01)

(52) U.S. Cl.
CPC .. *G06F 17/30598* (2013.01); *G06F 17/30545* (2013.01); *G06F 17/30575* (2013.01);
(Continued)

(58) Field of Classification Search
None
See application file for complete search history.

(56) References Cited

U.S. PATENT DOCUMENTS

| 7,281,005 B2 | 10/2007 | Canright |
| 9,858,130 B2 * | 1/2018 | Grewal ................. G06F 9/546 |

(Continued)

FOREIGN PATENT DOCUMENTS

WO    2016069047 A1    5/2016

OTHER PUBLICATIONS

Matthias Wiesmann et al, "Comparison of Database Replication Techniques based on Total Order Broadcast", IEEE Transactions on knowledge and data engineering, vol. 17, No. 4, Apr. 2005, pp. 551-566.*

(Continued)

*Primary Examiner* — Uyen Le
(74) *Attorney, Agent, or Firm* — Park, Vaughan, Fleming & Dowler LLP; Chia-Hsin Suen

(57) ABSTRACT

The disclosed embodiments provide a system for processing data. During operation, the system determines a current incoming queries per second (QPS) to one or more components for processing queries of a graph database, wherein the graph database is replicated across multiple clusters and distributed among a set of storage nodes in each of the clusters. Next, the system uses the current incoming QPS to estimate, for the one or more components, an expected QPS associated with fanning out of the queries to the clusters. The system then selects a number of clusters in the multiple clusters for fanning out of a query based on the expected QPS and one or more throughput limits for the one or more components. Finally, the system transmits the query to one or more of the storage nodes in the selected number of clusters.

20 Claims, 9 Drawing Sheets

(52) U.S. Cl.
CPC .. *G06F 17/30584* (2013.01); *G06F 17/30867* (2013.01); *G06F 17/30958* (2013.01); *H04L 45/46* (2013.01)

(56) References Cited

U.S. PATENT DOCUMENTS

| | | |
|---|---|---|
| 2010/0153404 A1 | 6/2010 | Ghosh |
| 2010/0199328 A1 | 8/2010 | Heins |
| 2012/0317121 A1 | 12/2012 | Fuchs et al. |
| 2013/0086063 A1 | 4/2013 | Chen |
| 2013/0097180 A1 | 4/2013 | Tseng |
| 2013/0124538 A1 | 5/2013 | Lee |
| 2013/0290226 A1 | 10/2013 | Dokken |
| 2015/0100661 A1* | 4/2015 | Heise .................. H04L 47/125 709/213 |
| 2015/0227619 A1 | 8/2015 | Xie |
| 2015/0302063 A1 | 10/2015 | Nigam |

OTHER PUBLICATIONS

David Chiu et al, "Evaluating and Optimizing Indexing Schemes for a Cloud-based Elastic Key-Value Store", 2011 11th IEEE/ACM International Symposium on Cluster, Cloud and Grid Computing, pp. 326-371.*

Auradkar, Aditya et al; "Data Infrastructure at LinkedIn", 28th International Conference on Data Engineering, (ICDE2012), (Apr. 1, 2012), 1370-1381.

Ozsu, Tamer M. et al; "Principles of Distributed Database Systems—Third Edition—Chapters 4, 6, 17", Principles of Distributed Database Systems, Third Edition, (Mar. 2, 2011), 131-169; 205-220; 657-722.

Song, Qing et al.; "Partitioning Graphs to Speed Up Point-to-Point Shortest Path Computations", Decision and Control Conference (CDC-ECC) 2011 50th IEEE (Dec. 12, 2011), 5299-5304.

* cited by examiner

THROUGHPUT-BASED FAN-OUT CONTROL IN SCALABLE DISTRIBUTED DATA STORES

RELATED APPLICATIONS

This application claims the benefit of U.S. Provisional Application No. 62/307,025, entitled "Partitioning and Replicating Data in Scalable Distributed Data Stores," by inventors SungJu Cho, Andrew J. Carter, Joshua D. Ehrlich and Jane Alam Jan, filed 11 Mar. 2016, which is incorporated herein by reference.

The subject matter of this application is related to the subject matter in a co-pending non-provisional application by inventors SungJu Cho, Qingpeng Niu, Andrew Carter and Sanjay Sachdev, entitled "Partial Graph Incremental Update in a Social Network," having Ser. No. 14/546,790, and filing date 18 Nov. 2014.

The subject matter of this application is also related to the subject matter in a co-pending non-provisional application by the same inventors as the instant application and filed on the same day as the instant application, entitled "Partitioning and Replicating Data in Scalable Distributed Data Stores," having serial number TO BE ASSIGNED, and filing date TO BE ASSIGNED.

The subject matter of this application is also related to the subject matter in a co-pending non-provisional application by the same inventors as the instant application and filed on the same day as the instant application, entitled "Fan-Out Control in Scalable Distributed Data Stores," having serial number TO BE ASSIGNED, and filing date TO BE ASSIGNED.

BACKGROUND

Field

The disclosed embodiments relate to scalable distributed data stores. More specifically, the disclosed embodiments relate to techniques for performing throughput-based fan-out control in scalable distributed data stores.

Related Art

Social networks may include nodes representing individuals and/or organizations, along with links between pairs of nodes that represent different types and/or levels of social familiarity between the nodes. For example, two nodes in a social network may be connected as friends, acquaintances, family members, and/or professional contacts. Social networks may be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

Social networks and/or online professional networks may also facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. To fully leverage the online professional network in conducting business activities, the individuals and/or organizations may perform complex queries of the online professional network. For example, a sales professional may identify sales prospects by searching the online professional network for a chain of individuals and/or organizations that can be used to connect the sales professional to the sales prospects.

However, complex querying of social and/or online professional network data may be time- and/or resource-intensive. For example, a query that finds possible paths between two nodes in the online professional network may require a scan of all links between individuals and/or organizations that may be used to form a path connecting the nodes, with the number of links to be scanned increasing exponentially with the number of hops in the path. Moreover, a subset of the individuals and/or organizations may have a significantly larger than average number of links to other individuals and/or organizations, resulting in the added consumption of computational resources and/or time during execution of the query if the individuals and/or organizations are included in the search space of the query. In turn, an uneven distribution of graph database data and queries among multiple storage and/or query nodes may result in issues such as tail latency, network congestion, and/or CPU-bounding.

Consequently, querying of social and/or online professional networks may be facilitated by mechanisms for improving the performance and scalability of complex queries of social and/or online professional network data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
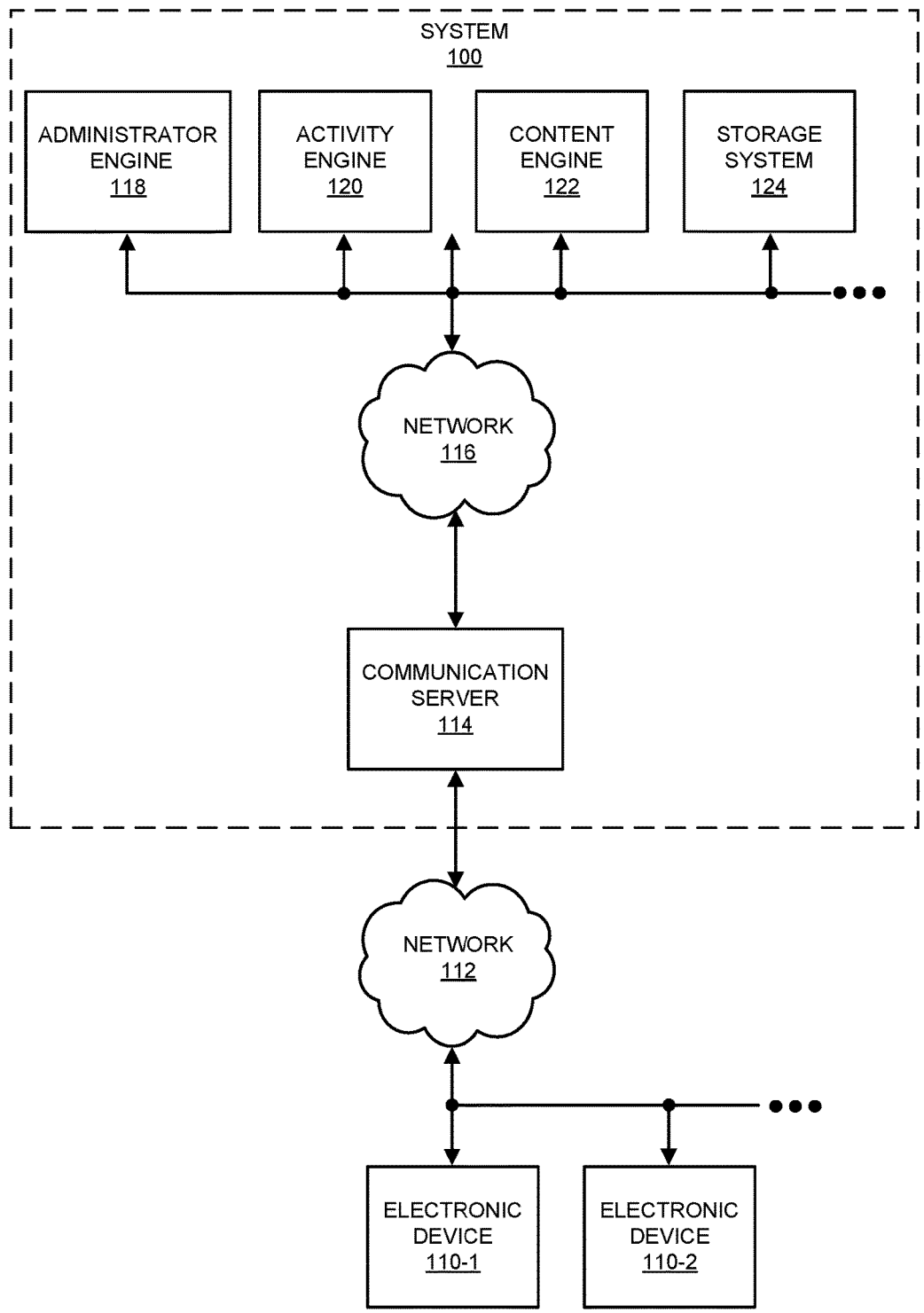
FIG. 1 shows a schematic of a system in accordance with the disclosed embodiments.

The disclosed embodiments provide a method, apparatus and system for processing queries of a graph database. A system 100 for performing a graph-storage technique is shown in FIG. 1. In this system, users of electronic devices 110 may use a service that is provided, at least in part, using one or more software products or applications executing in system 100. As described further below, the applications may be executed by engines in system 100.

Moreover, the service may be provided, at least in part, using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a user community), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale storage system.

Note that each of the users of the social network may have an associated user profile that includes personal and professional characteristics and experiences, which are sometimes collectively referred to as 'attributes' or 'characteristics.' For example, a user profile may include: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network.

Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

It may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner.

For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may, therefore, be time-consuming. This degraded performance may, in turn, degrade the user experience when using the applications and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
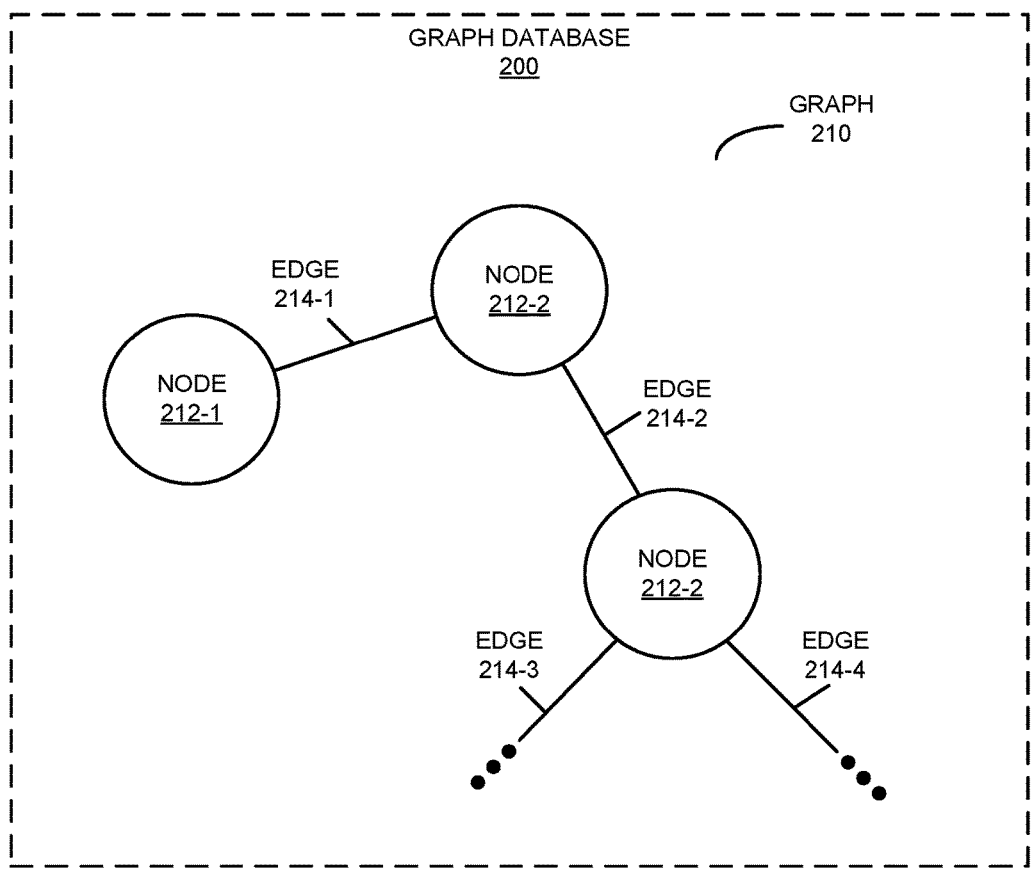
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212 and edges 214 between nodes 212 to represent and store the data with index-free adjacency, i.e., so that each node 212 in graph 210 includes a direct edge to its adjacent nodes without using an index lookup.

Note that graph database 200 may be an implementation of a relational model with constant-time navigation, i.e., independent of the size N, as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that preserves intact the structure (i.e., nodes, edges) of the subset of graph 210.

The graph-storage technique may include embodiments of methods that allow the data associated with the applications and/or the social network to be efficiently stored and retrieved from graph database 200. Such methods are described in a co-pending non-provisional application by inventors SungJu Cho, Qingpeng Niu, Andrew Carter and Sanjay Sachdev, entitled "Partial Graph Incremental Update in a Social Network," having Ser. No. 14/546,790, and filing date 18 Nov. 2014 (Attorney Docket No. P1384.LNK.US; 3080.C63US1), which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
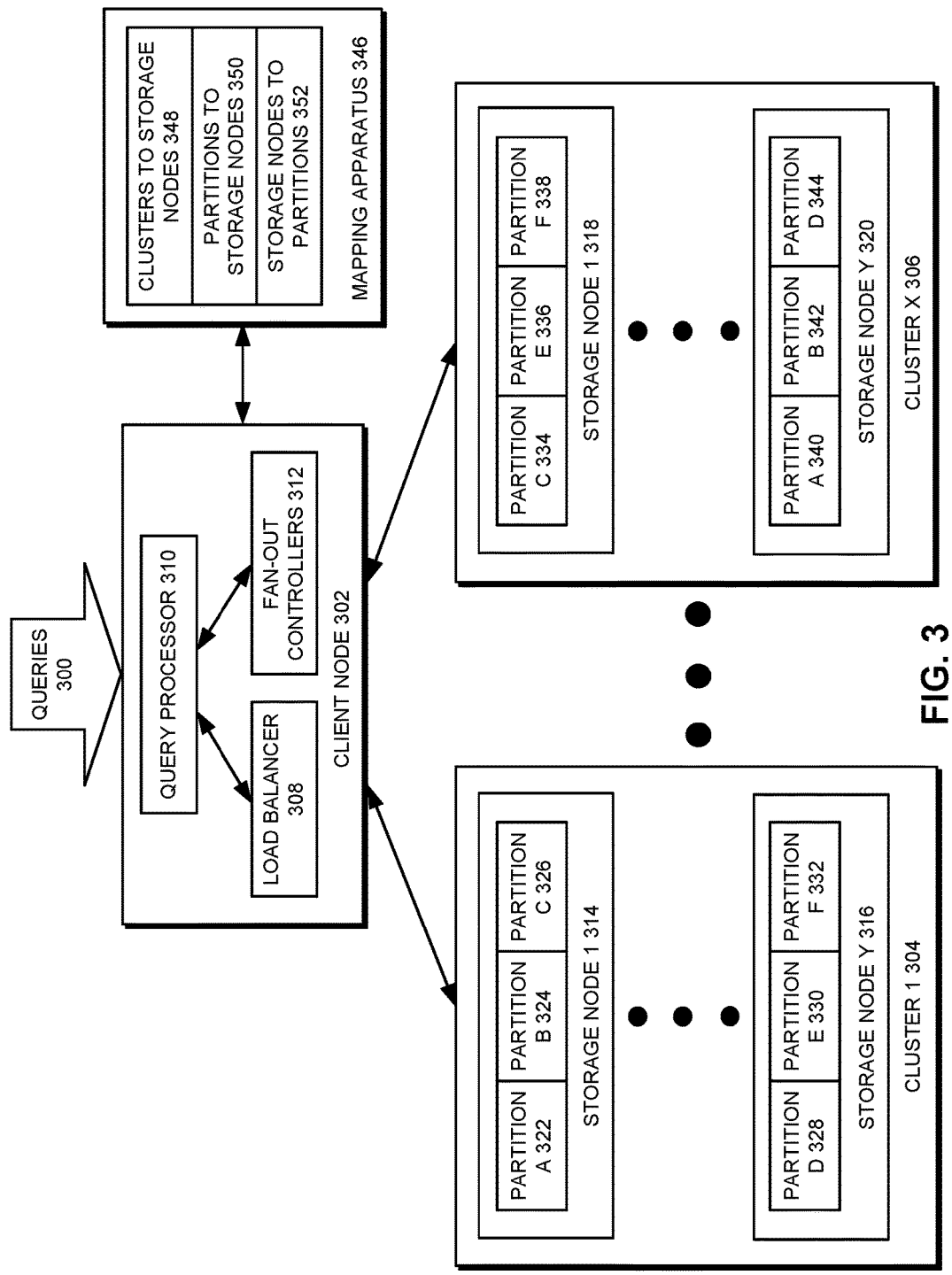
FIG. 3 shows a system for processing queries of a graph database in accordance with the disclosed embodiments.

In one or more embodiments, effective querying of graph database 200 is enabled by mechanisms for partitioning, replicating, and providing fan-out control in graph database 200. As shown in FIG. 3, queries 300 of graph database 200 may be received by a client node 302. Client node 302 may process the queries by issuing requests for data associated with the queries to storage nodes (e.g., storage node 1 314 and/or storage node y 316 of cluster 1 304, storage node 1 318 and/or storage node y 320 of cluster 2 306) on which the graph database is stored. Client node 302 may subsequently receive data in response to the requests from the storage nodes and generate responses to the queries based on the received data. For example, client node 302 may perform additional analysis, aggregation, unioning, joining, filtering, and/or other operations on the received data before including the data in the responses.

In addition, multiple instances of client node 302 may execute to scale with the volume of graph database queries and/or provide specialized services related to the processing of the queries. For example, one or more instances of client node 302 may provide an application-programming interface (API) that allows applications, services, and/or other components to retrieve social network data stored in the graph database.

One or more other instances of client node 302 may provide a caching service that caches second-degree networks of social network members represented by nodes in the graph. The caching service may also provide specialized services related to calculating a member's second-degree network, calculating the size of the member's second-degree network, using cached network data to find paths between pairs of members in the social network, and/or using cached network data to calculate the number of hops between the pairs of members. In turn, instances of the caching service may be used by instances of the API to expedite processing of certain types of graph database queries.

In the system of FIG. 3, the graph database is replicated across a set of clusters (e.g., cluster 1 304, cluster x 306). Each cluster may include a separate set of storage nodes on which data in the graph database is stored. For example, each cluster may contain 20 physical machines representing 20 storage nodes, with approximately ½₀ of the data in the graph database stored in each storage node. Storage nodes may be added to existing clusters to reduce the memory footprint of each storage node, and new clusters may be added to scale with the volume of graph database queries. Because each cluster contains a complete copy of the graph database, graph database queries may be processed by a given cluster independently of the addition, removal, maintenance, downtime, and/or uptime of the other clusters and/or storage nodes in the other clusters.

Data in the graph database may further be divided into a set of logical partitions, with multiple partitions stored on each storage node, such as partition A 322, partition B 324, and partition C 326 on storage node 1 314 of cluster 1 304; partition D 328, partition E 330, and partition F 332 on storage node Y 316 of cluster 1 304; partition C 334, partition E 336, and partition F 338 on storage node 1 318 of cluster X 306; and partition A 340, partition B 342, and partition D 344 on storage node X 320 of cluster X 320. All partitions of the graph database may be distributed across the storage nodes in a given cluster so that each cluster contains a complete copy of the graph database. Continuing with the previous example, the graph database may be divided into 1,000 logical partitions that are distributed among the storage nodes of each cluster such that each storage node contains 50 different partitions. The number of partitions may also be selected to be much larger than the number of storage nodes in each cluster to avert repartitioning of the graph database when new storage nodes are added to the cluster.

A horizontal hash-based partitioning strategy may be used to divide data in the graph database into the partitions. In the horizontal hash-based partitioning strategy, a pseudo-random hash function may be used to calculate a hash from a key used in querying of the graph database. The hash may be used to identify a partition of the graph database, and all data associated with the key may be stored in the partition. Continuing with the previous example, a hash value ranging from 1 to 1000 may be produced from a node identifier (e.g., member identifier of a social network member) and a node type (e.g., person, company, organization, school, etc.) of a node in the graph. The hash value may be matched to a numeric identifier for a partition, and all edges associated with the node may be stored in the partition. In other words, an identifier for a member of the social network may be hashed to obtain a partition storing graph data associated with the member, all of the member's first-degree connections may be stored in the partition, and the member's identifier may be used as a forward index to the member's first-degree connections. Consequently, a query for the member's first-degree connections may be processed by a single storage node containing the partition instead of multiple storage nodes across which an inverted index of the first-degree connections is distributed.

To improve the distribution of load across the storage nodes, partitions may be assigned to different nodes in different clusters. For example, 1,000 partitions may be distributed across 20 storage nodes in a first cluster by selecting 50 random partitions to be stored on each of the storage nodes without duplicating any partitions among multiple storage nodes in the first cluster. The partitions may then be distributed across 20 storage nodes in a second cluster by generating a different random assignment of 50 partitions to each storage node in the second cluster, again without duplicating any partitions among multiple storage nodes in the second cluster.

Because no two storage nodes contain the same set of partitions, workload hot spots in storage nodes of a given cluster are less likely to be replicated in the other cluster. For example, partitions A and C may contain data that is associated with large numbers of queries, such as data that is associated with popular or highly connected social network members. Since both partitions are found on storage node 1 314 in cluster 1 304, that storage node may generally experience a higher load than other storage nodes in the cluster. On the other hand, the partitions are stored on different storage nodes in cluster X 306, thus averting the replication of the hot spot in cluster X 306.

To track the distribution of data across multiple partitions, storage nodes, and clusters, a mapping apparatus 346 may maintain multiple sets of mappings among the partitions, storage nodes, and clusters. One set of mappings 348 may be from clusters to storage nodes in the clusters. For example, mapping apparatus 346 may map an identifier for each cluster to a set of identifiers of storage nodes in the cluster. Another set of mappings 350 may be from partitions to storage nodes storing the partitions. For example, mapping apparatus 346 may map an identifier for each partition to a set of identifiers of storage nodes on which the partition is stored, with the number of storage nodes mapped to the partition equal to the number of clusters across which the graph database is replicated. A third set of mappings 352 may be from storage nodes to partitions stored on the storage nodes. For example, mapping apparatus 346 may map a unique identifier for each storage node to a set of identifiers of partitions stored on the storage node.

Mappings maintained by mapping apparatus 346 may be transmitted to each instance of client node 302, and a local copy of the mappings may be maintained by the instance. Mapping apparatus 346 may broadcast changes to the mappings to all instances of client node 302, and the instances may update the corresponding local copies with the changes. By maintaining and communicating an up-to-date representation of the layout of the graph database across the partitions, storage nodes, and clusters, mapping apparatus 346 may facilitate maintenance and/or repartitioning operations that require a given cluster to be taken out of service without disrupting the processing of queries by other clusters.

A query processor 310 in each instance of client node 302 may use the local copy of the mappings to identify partitions containing data associated with a given query (e.g., by hashing keys in the query), select one or more clusters for processing of the query, and identify storage nodes in the selected cluster(s) containing the partitions. The query processor may then generate requests containing portions of the query (e.g., keys) to the respective storage nodes, obtain the requested data from the storage nodes, and return the data in a response to the query.

In one or more embodiments, the system of FIG. 3 includes functionality to provide adaptive and/or throughput-based fan-out control during processing of graph database queries 300. First, query processor 310 may identify a query type of the query, and one or more fan-out controllers 312 in client node 302 may determine a fan-out of a query to a number of clusters based on the query type, as described in further detail below with respect to FIG. 4. For example, query processor 310 and/or the fan-out controllers 312 may minimize the fan-out for latency-sensitive queries and increase the fan-out for queries that are likely to terminate early.

Second, query processor 310 and/or fan-out controllers 312 may limit the fan-out so that an expected queries per second (QPS) to or from client node 302, one or more storage nodes, and/or another component of the system does not exceed the throughput limits of the component, as described in further detail below with respect to FIG. 5. For example, the query processor and/or fan-out controllers may prevent fanning out of queries from exceeding a maximum throughput that triggers the queuing or dropping of requests and/or responses by the component.

After a fan-out of the query to a certain number of clusters is determined, a load balancer 308 in client node 302 may use a round-robin and/or other load-balancing technique to distribute the query to the clusters. First, load balancer 308 may randomly select the determined number of clusters as a subset of available clusters in the system. For example, if a fan-out controller selects a fan-out of the query to three clusters, the load balancer may randomly select three out of 20 available clusters for processing of the query.

For each partition of the graph database, the load balancer may generate a queue of storage nodes containing the partition in the selected clusters. Continuing with the above example, the load balancer may use mappings from mapping apparatus 346 to generate, for each partition, a queue of three storage nodes from the three selected clusters in which the partition is stored.

Next, the load balancer may obtain a set of keys from the query and match the keys to the partition identifiers of partitions containing the corresponding data. For example, the load balancer may calculate a hash from each key and use the hash as the identifier for the corresponding partition. Load balancer 308 may then select a storage node containing the corresponding partition from the randomly selected clusters and assign the key to the storage node. For example, the load balancer may assign the key to the storage node at the front of the queue for the partition. After the storage node is assigned, the storage node is placed in the back of the queue. If a storage node is assigned to multiple keys, the load balancer may bundle the keys into a single request to the storage node.

By distributing keys evenly across storage nodes in a selected subset of clusters, load balancer 308 may minimize tail latency in processing of the requests by the storage nodes. To further facilitate an even distribution of workload across the storage nodes, the load balancer may remove key assignments from heavily assigned storage nodes and reassign the keys to under-assigned storage nodes, such as storage nodes in clusters that are not currently used to process other queries from client node 302.

Those skilled in the art will appreciate that the system of FIG. 3 may be implemented in a variety of ways. As mentioned above, multiple instances of client node 302 may be used to process queries from other components or services and/or provide caching of second-degree networks that is used by other client nodes during processing of the queries. Along the same lines, client node 302 and the storage nodes may be provided by a single physical machine, multiple computer systems, one or more virtual machines, a grid, a number of clusters, one or more databases, one or more filesystems, and/or a cloud computing system. Components of each node may additionally be implemented together and/or separately by one or more software components and/or layers.

Along the same lines, the functionality of fan-out controllers 312 may be implemented in a number of ways. For example, different fan-out controllers may be used to select fan-outs of different types of queries to the storage nodes and/or clusters, with or without implementing additional throughput-based fan-out control for some or all of the query types. Alternatively, the fan-out of multiple types of queries may be managed by a single fan-out controller that obtains the query type and/or other attributes of each query and/or sub-queries in the query as parameters from query processor 310.

Those skilled in the art will also appreciate that the system of FIG. 3 may be adapted to other types of functionality. For example, operations related to the partitioning and replication of data and/or the fanning out of queries may be used with other types of data and/or data stores.

Figure 4:
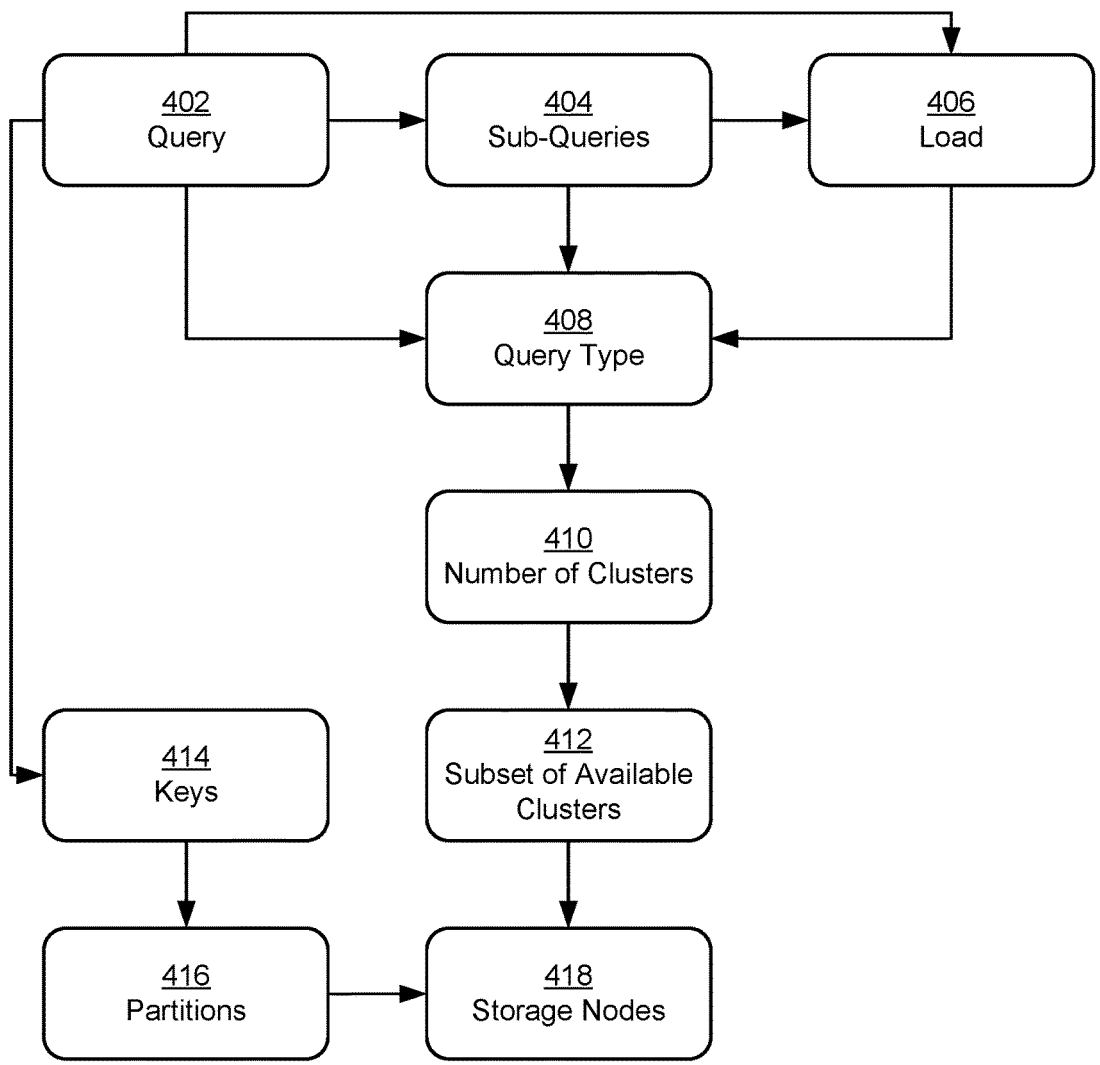
FIG. 4 shows the use of fan-out control during processing of a query of a graph database in accordance with the disclosed embodiments.

FIG. 4 shows the use of fan-out control during processing of a query 402 of a graph database in accordance with the disclosed embodiments. As mentioned above, the fan-out of query 402 to a number of clusters 410 may be based on a query type 408 of query 402. Query type 408 may be determined by analyzing the parameters, operations, and/or other attributes associated with query 402.

In particular, one or more operations associated with query 402 may be encoded in a method or function call to a graph database API provided by a client node, such as client node 302 of FIG. 3. For example, a service, application, or component may call the API to generate queries related to edge set lookups for one or more graph nodes, graph traversals such as distance badging (i.e., computing, up to three hops, the distance between a source graph node and one or more destination graph nodes) or path finding, common entity computation (i.e., determining if two graph nodes have common connections, schools, companies, and/or influencers), and/or network size calculation (e.g., calculating the size of a graph node's second-degree network).

As described above, one or more instances of the client node may provide a caching service that caches second-degree networks of the nodes. Cached network data from the caching service may be used to expedite the processing of queries related to distance badging, path finding, and network size computation. Conversely, processing of other queries (e.g., edge set lookups, common entity computation, etc.), sub-queries 404 within complex queries, and/or cache refreshes may be performed by generating fan-out requests to storage nodes in the clusters.

In turn, the types of fan-out requests used to process query 402 may be included in query type 408 by a query processor in the client node, such as query processor 310 of FIG. 3. For example, a single-key lookup query that retrieves data from a single partition may have an "asynchronous" query type because the query processor does not rely on a fan-out of requests to the clusters to process the query. On the other hand, a "synchronous" query type may include a calculation of a second-degree network of a graph node, which requires a fan-out of the query to multiple storage nodes containing first-degree networks of the first-degree connections of the graph node to perform the calculation.

When query 402 contains multiple sub-queries 404, the types of the sub-queries may be included in query type 408. For example, a distance badging query may be performed by retrieving, from the caching service, the second-degree network of the source node and using the second-degree network to identify destination nodes that are one or two hops from the source node. If the cached second-degree network is missing or stale, the caching service may retrieve the second-degree network of the source node by generating a request for the source node's first-degree connections, followed by a "union fan-out request" that produces the source node's second-degree connections as the union of the first-degree networks of the source node's first-degree connections. When a cache miss occurs, the source node's second-degree network is generated synchronously through a "synchronous union fan-out request." When the caching service has a stale cache of the source node's second-degree network, the stale cache is returned to the distance badging query and asynchronously updated by the caching service through an "asynchronous union fan-out request."

The third-degree distance between the source node and remaining destination nodes that are not in the second-degree network of the source node may then be calculated by retrieving the first-degree networks of the remaining destination nodes and performing an intersection of each of the first-degree networks with the second-degree network of the source node. Because the first-degree networks of the remaining destination nodes are compared separately with the second-degree network of the source node and not one another, retrieval of the first-degree networks may be performed using a "non-union fan-out request" to the clusters, which may be included in query type 404 of the distance badging query. When a cache refresh is triggered by the distance badging query, the synchronous or asynchronous union fan-out request of the cache refresh may also be included in the query type.

Query type 408 may also be based on a load 406 of query 402 and/or sub-queries 404. Load 406 may be based on the number of elements (e.g., keys) in the query. For example, a query with 100 keys may be expected to incur approximately 10 times the load of a similar query with 10 keys. Load 406 may also, or instead, be based on the type of operation associated with the query. For example, computationally expensive operations such as joins, intersections, and/or filtering may be associated with a higher load than simpler operations such as edge set lookups.

After query type 408 is identified, number of clusters 410 for fanning out of query 402 may be determined based on the query type. More specifically, a fan-out of query 402 to number of clusters 410 may be represented using the following equation:

$$L = L_{client}(n_{selected}) + \max_{i}\left(L_{server_i}\left(\frac{k}{n_{selected}}\right)\right)$$

In the above equation, L represents the latency of the query, $n_{selected}$ represents number of storage nodes selected in processing of a query, and k represents the number of keys in the query. $L_{client}$ represents the latency of the client node in issuing requests to the storage nodes and processing responses to the requests from the storage nodes, and $L_{server,i}$ is the latency of an individual storage node i in processing a request from the client node. The right term thus represents the latency of each request generated in a fan-out of the query, which includes network transfer latency and processing latency on all of the storage nodes.

An aggressive fan-out may increase $n_{selected}$ and the left term in the equation and decrease the right term in the equation. Because the right term is generally larger than the left term, an aggressive fan-out may intuitively improve the latency of the query. However, storage node latencies may have a long-tailed distribution, and an increase in the fan-out of the query may produce a corresponding increase in the probability of issuing a request with a high latency. Consequently, number of clusters 410 may be selected to balance the distribution of workload across the clusters with tail latency on the storage nodes and CPU bounding on the client node from processing large numbers of fan-out requests.

More specifically, query 402 may include a latency-sensitive query type 408 when responses to all fan-out requests are required to produce a response to the query. For example, the distance badging query may require receipt of all responses to the "non-union fan-out request" to calculate third-degree connections between the source node and remaining destination nodes. In another example, the calculation of a node's second-degree network may include a "synchronous union fan-out request" that applies a union operation to the first-degree connections of the node's first-degree connections. Because the latency of both queries is directly influenced by the latencies of individual fan-out requests, number of clusters 410 may be selected to minimize the fan-out of the queries to storage nodes 418 in the clusters. Conversely, if query type 408 is not latency-sensitive, fanning out of query 402 may be performed based on other factors and/or elements of query type 408.

As mentioned above, query type 408 may also include the load of query 402. For example, the load may be based on the number of elements in the query and/or the types of operations (e.g., joins, unions, intersections, filtering, aggregation, etc.) performed within the query. In turn, number of clusters 410 may be selected to be proportional to the load so that the load is more evenly distributed across the clusters while avoiding tail-latency and/or other issues associated with overloading storage nodes 418. For example, a "heavy" query with 100 keys may be distributed across storage nodes in five clusters, while a "light" query with 10-20 keys may be distributed across storage nodes in one or two clusters.

Query type 408 may further account for the likelihood of early termination of query 402. More specifically, the query type may be "early terminable" when a result of the query may be returned after at least one corresponding result is returned in response to a fan-out of the query. For example, a common entity query that identifies the presence or absence of a common node (e.g., connection, school, company, influencer, etc.) between two other nodes may return once a single common node is found by a partition of the graph database. Consequently, an early terminable query may be processed by selecting an aggressive fan-out to the clusters to reduce the number of partitions involved in processing on each storage node involved in the fan-out.

More generally, number of clusters 410 may be selected based on the query's probability of early termination. For example, a query with a higher probability of early termination may have a greater fan-out than a query with a lower probability of early termination.

Finally, multiple query types of query 402 may be combined to select number of clusters 410. For example, an asynchronous heavy query may result in a fan-out to a greater number of clusters because load distribution of the query is more important than latency. On the other hand, a light, latency-sensitive query may have a reduced fan-out to expedite processing of the query.

After number of clusters 410 is determined for query 402, a set of storage nodes 418 in the determined number of clusters is selected for fanning out of the query. First, a subset of available clusters 412 matching the determined number is selected. For example, the subset may be selected randomly from the available clusters and/or according to a load-balancing technique. Next, keys 414 are obtained from the query, and a set of graph database partitions 416 containing the keys is identified. For example, hashes of the keys may be matched to identifiers for the partitions.

Storage nodes 418 in the subset of available clusters may then be selected for processing of the query using a round-robin and/or other load-balancing technique, and a fan-out of the query to the selected nodes is generated. For example, storage nodes containing the partitions in the selected subset of available clusters may be identified using a set of mappings, such as mappings maintained by mapping apparatus 346 of FIG. 3. Each subset of keys 414 in the query associated with a storage node selected for processing of the subset may then be transmitted in a request to the storage node. Finally, responses from one or more of the storage nodes may be received and used to produce a response to the query 402. For example, a response from a single storage node that confirms the existence of a common entity between two graph nodes may be used to generate a positive response to a common entity query containing the graph nodes. Conversely, a query with a synchronous fan-out may require responses to all requests in the fan-out before a response to the query can be produced.

Figure 5:
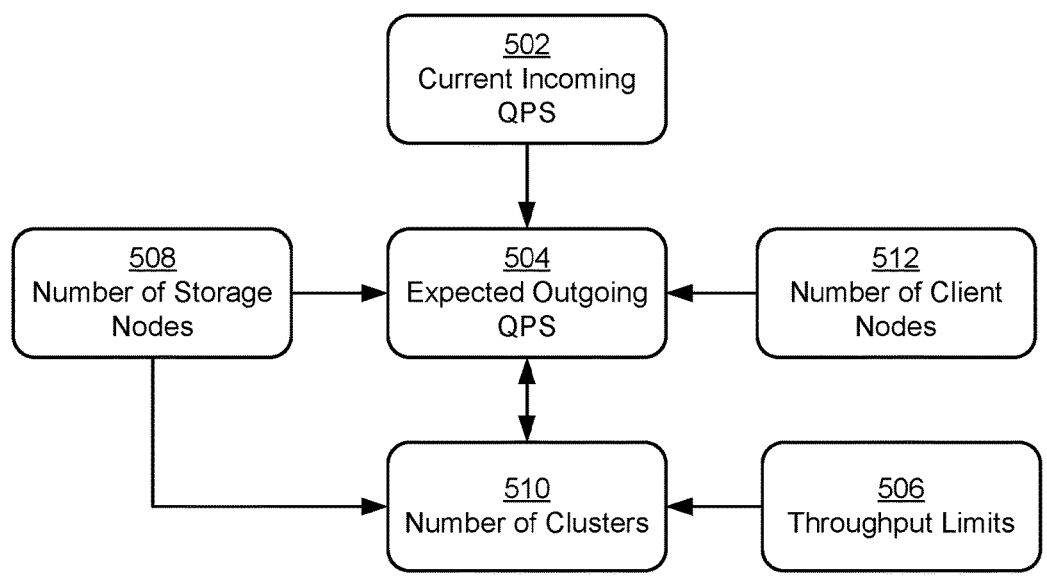
FIG. 5 shows the use of throughput-based fan-out control during processing of a query of a graph database in accordance with the disclosed embodiments.

FIG. 5 shows the use of throughput-based fan-out control during processing of a query of a graph database in accordance with the disclosed embodiments. As shown in FIG. 5, a number of clusters 510 for fanning out of the query may be selected based on a current incoming QPS 502, expected outgoing QPS 504, throughput limits 506, number of storage nodes 508, and/or number of client nodes 512 associated with processing of the query.

Current incoming QPS 502 and expected outgoing QPS 504 may represent the volume of queries, requests, and/or other types of communication to which responses are expected. Current incoming QPS 502 may be measured for client nodes that receive queries of the graph database (e.g., client node 302 of FIG. 3), and expected outgoing QPS 504 may be calculated or estimated from fan-out requests from the client nodes. For example, current incoming QPS 502 may represent the current volume of queries received by a client node, and expected outgoing QPS 504 may represent the fan-out of the queries from the client node into a number of requests to storage nodes containing data that can be used to resolve the queries.

To improve the throughput of query processing by the client and storage nodes, number of clusters 510 may be selected so that expected outgoing QPS 504 does not exceed one or more throughput limits 506 for the client and/or storage nodes. Each throughput limit may represent a maximum throughput past which the corresponding component (e.g., client or storage node) is unable to process queries, requests, and/or responses in a timely manner. Instead, the component may queue or drop the pending queries, requests, and/or responses, thereby resulting in a significant increase in the latency of the queries and/or requests and a decrease in the throughput of the component. Such throughput limits may be determined using performance testing of the components.

For example, values of current incoming QPS 502 for the system of FIG. 3 may be represented using the following:

$$E_{RPS} = cnC_{QPS}(t)$$

In the above equation, $E_{RPS}(t)$ represents expected outgoing QPS 504 from a client node, $C_{QPS}(t)$ represents current incoming QPS 502 for the client node, c represents a candidate number of clusters 510 selected for processing of one or more queries received at the client node (up to a total number of clusters across which the graph database is replicated) by another fan-out control method (e.g., the fan-out control method of FIG. 4), and n represents number of storage nodes 508 in each cluster. Thus, $E_{RPS}(t)$ may be a value of expected outgoing QPS 504 that is calculated by multiplying current incoming QPS 502 for the client node by the candidate number of clusters and the number of storage nodes per cluster.

In turn, an optimal fan-out to a selected number of clusters 510 $c_{selected}$ may be identified using the following:

$$c_{selected} = \min\left(c, \frac{cD_{RPS}}{E_{RPS(t)}}\right)$$

In the above equation, $D_{RPS}$ represents the throughput limit of a client node in the volume of requests transmitted from the client node to the storage nodes. In other words, number of clusters 510 may be selected to not exceed the product of the throughput limit and the candidate number of clusters divided by the expected outgoing QPS, or put another way, the throughput limit divided by a product of number of storage nodes 508 and current incoming QPS 502.

Selection of number of clusters 510 may additionally account for throughput limits 506 at the storage nodes. Continuing with the previous example, the total volume of requests to the storage nodes may be represented by the following:

$$\Sigma E_{SRPS}(t) = cnmC_{QPS}(t)$$

More specifically, $E_{SRPS}(t)$ represents the expected incoming QPS to a given storage node, and m represents number of client nodes 512. If cn represents the total number of storage nodes across which the queries can be fanned out, the expected incoming QPS may be computed using the following:

$$E_{SRPS}(t) = mC_{QPS}(t)$$

In turn, number of clusters 510 $c_{selected}$ may be selected using the following:

$$c_{selected} = \min\left(c, \frac{D_{RPS}}{nC_{QPS}(t)}, \frac{cD_{SRPS}}{mC_{QPS}(t)}\right)$$

In the above equation, $D_{SRPS}$ represents the throughput limit of a single storage node in the volume of requests received by the storage node from the client nodes. Consequently, number of clusters 510 may additionally be selected to not exceed a product of the throughput limit of the storage node and the candidate number of clusters divided by a product of number of client nodes 512 and current incoming QPS 502. In turn, the throughput-based fan-out control of FIG. 5 may be combined with the type-based fan-out control of FIG. 4 to customize fanning out of queries to the storage nodes without causing performance degradation in both the client and storage nodes.

Figure 6:
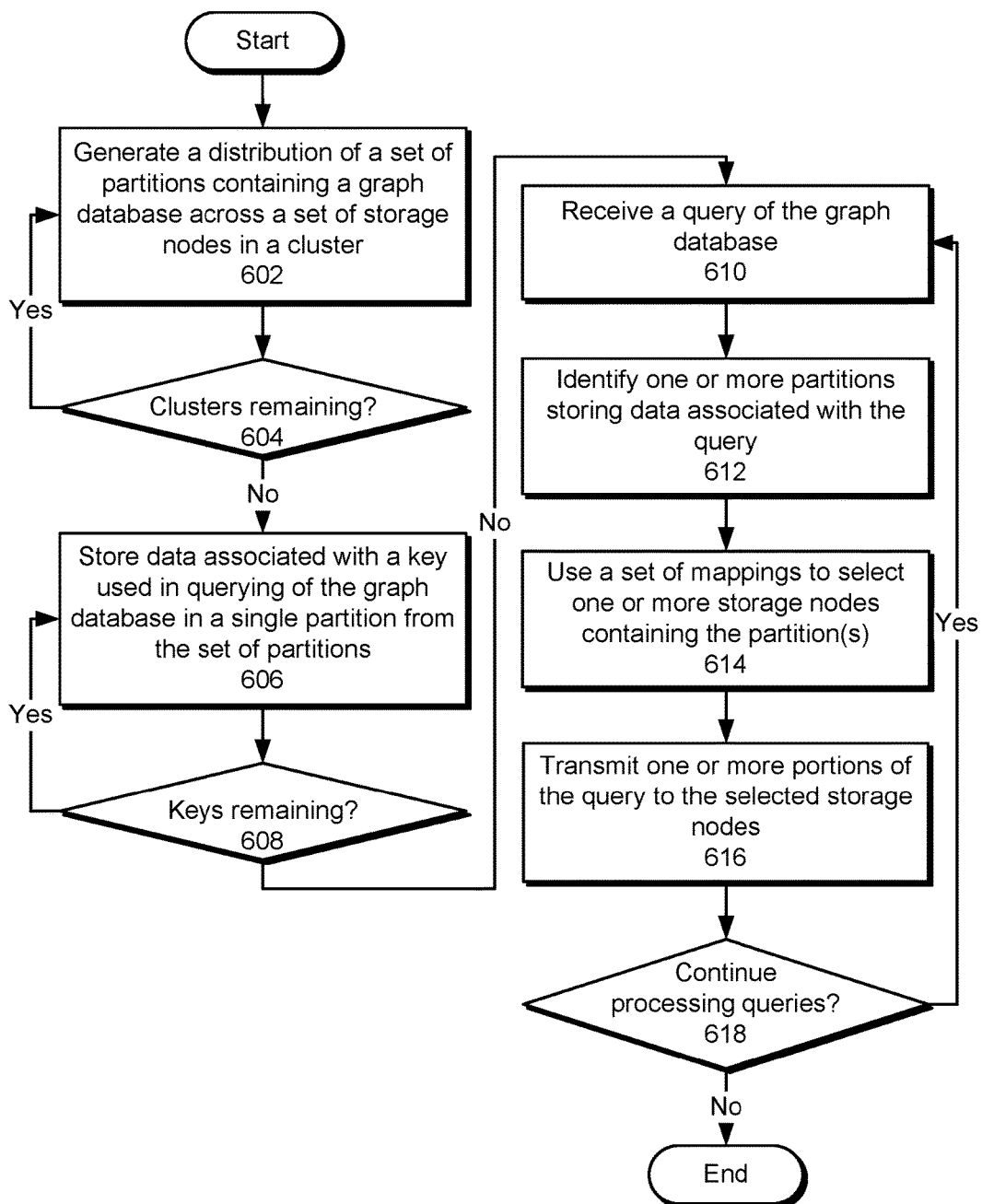
FIG. 6 shows a flowchart illustrating the processing of queries of a graph database in accordance with the disclosed embodiments.

FIG. 6 shows a flowchart illustrating the processing of queries of a graph database in accordance with the disclosed embodiments. More specifically, FIG. 6 shows a flowchart of query processing using partitioned and replicated data in a scalable distributed data store. In one or more embodiments, one or more of the steps may be omitted, repeated, and/or performed in a different order. Accordingly, the specific arrangement of steps shown in FIG. 6 should not be construed as limiting the scope of the technique.

Initially, a distribution of a set of partitions containing a graph database across a set of storage nodes in a cluster is generated (operation 602). For example, the storage nodes may be individual physical and/or virtual machines in the cluster, and the number of partitions may be selected to be significantly larger than the number of storage nodes. For each storage node in the cluster, a subset of the partitions may be selected for storing on the storage node, and a set of mappings containing the partitions, storage nodes, and the cluster may be updated based on the randomly selected subset of the partitions. The process may be repeated for remaining clusters (operation 604) until a different distribution of the partitions across the storage nodes is generated for each of the clusters.

Next, data associated with a key used in querying of the graph database is stored in a single partition from the set of partitions (operation 606). For example, the key may include an identifier for a node in the graph, and the data may include a set of edges associated with the node. Thus, a query for all edges and/or other attributes associated with the node may be processed by the single partition. Such storing of data may be repeated for remaining keys (operation 608) in the graph.

A query of the graph database is then received (operation 610). For example, the query may involve edge set lookups, distance badging, path finding, common entity computation, and/or network size calculation for one or more nodes in the graph. To process the query, one or more partitions storing data associated with the query are identified (operation 612). For example, hashes of keys in the query may be matched to identifiers for the partitions.

Also, a set of mappings is used to select one or more storage nodes containing the partition(s) (operation 614). For example, mappings of clusters to storage nodes, partitions to storage nodes, and/or storage nodes to partitions may be used to identify the locations of the partition(s) in the clusters, and some or all of the storage nodes containing the partition(s) may be selected in processing of the query, as described in further detail below with respect to FIG. 7.

One or more portions of the query are then transmitted to the selected storage nodes (operation 616). For example, multiple keys and/or other portions of the query may be transmitted in a single request to a storage node containing partitions storing data associated with the portions.

Processing of the queries may continue (operation 618) during use of the clusters, storage nodes, and/or partitions to provide the graph database. Each query may be received (operation 610) and matched to one or more partitions storing data associated with the query (operation 612). The mappings may then be used to select one or more storage nodes containing the partition(s) (operation 614), and portions of the query may be transmitted to the corresponding storage nodes (operation 616) for processing of the portions by the storage nodes. Such processing of queries may continue until querying of the graph database is no longer performed using the clusters, storage nodes, and/or partitions.

Figure 7:
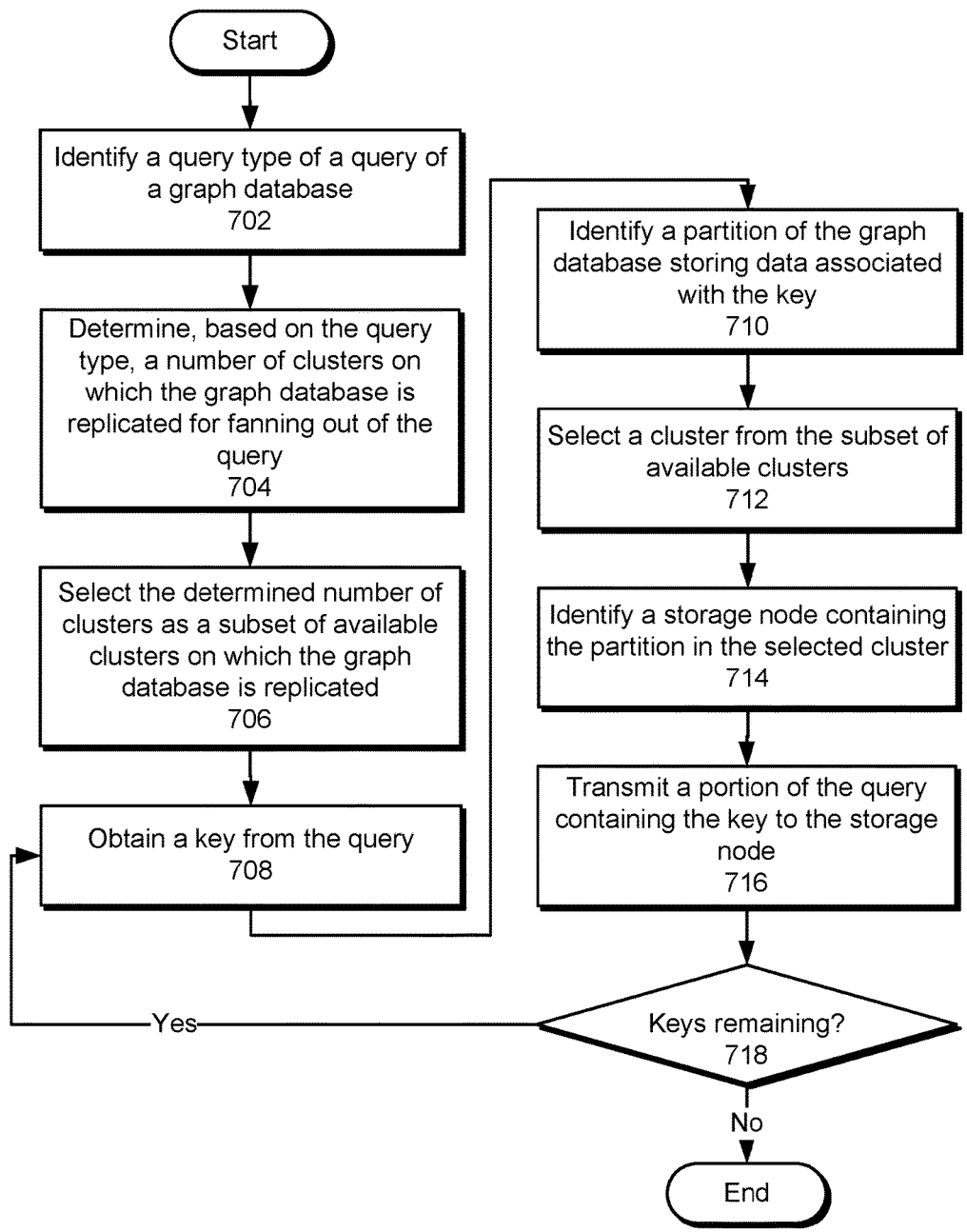
FIG. 7 shows a flowchart illustrating the processing of queries of a graph database in accordance with the disclosed embodiments.

FIG. 7 shows a flowchart illustrating the processing of queries of a graph database in accordance with the disclosed embodiments. In particular, FIG. 7 shows a flowchart of applying type-based fan-out control to a query of a scalable distributed data store. In one or more embodiments, one or more of the steps may be omitted, repeated, and/or performed in a different order. Accordingly, the specific arrangement of steps shown in FIG. 7 should not be construed as limiting the scope of the technique.

First, a query type of a query of a graph database is identified (operation 702). Illustratively, the query type may reflect a sensitivity of the query to latency, a load associated with the query, and/or a probability of early termination for the query. For example, the query may be identified as a latency-sensitive query if the query is a synchronous query and/or a distance badging query. In another example, the load of the query may be identified from the number of elements and/or types of operations in the query. In a third example, the query may be identified as an early-terminable query if a result of the query may be returned after at least one corresponding result is returned in response to a fan-out of the query. If the query can be divided into multiple sub-queries, the type of each sub-query may be included in the query type of the query.

Next, a number of clusters on which the graph database is replicated is determined for fanning out of the query based on the query type (operation 704). For example, the number of clusters may be selected to minimize the fan-out of a latency-sensitive query. In another example, the number of clusters may be selected to be proportional to the load of the query. In a third example, the number of clusters may be selected based on the probability of early termination of the query.

The determined number of clusters is then selected as a subset of available clusters on which the graph database is replicated (operation 706). For example, a fan-out of the query to four clusters may be initiated by selecting four random clusters out of a larger number of available clusters for processing of graph database queries. Conversely, one or more of the clusters may be selected based on the current loads and/or other attributes of the clusters.

To process the query using the selected clusters, a key is obtained from the query (operation 708), and a partition of the graph database storing data associated with the key is identified (operation 710). A cluster from the subset of available clusters is also selected (operation 712), and a storage node containing the partition in the selected cluster is identified (operation 714). For example, the cluster may be selected using a round-robin and/or other load-balancing technique, and mappings containing the clusters, storage nodes, and/or partitions may be used to identify the storage node in the cluster that contains the partition.

A portion of the query containing the key is then transmitted to the storage node (operation 716). As discussed above, the key may be grouped with other keys from the query in a single request to the storage node when data for the grouped keys can be found in one or more partitions on the storage node. Operations 708-716 may be repeated for remaining keys (operation 718) in the query until requests have been generated and transmitted for all keys in the query.

Figure 8:
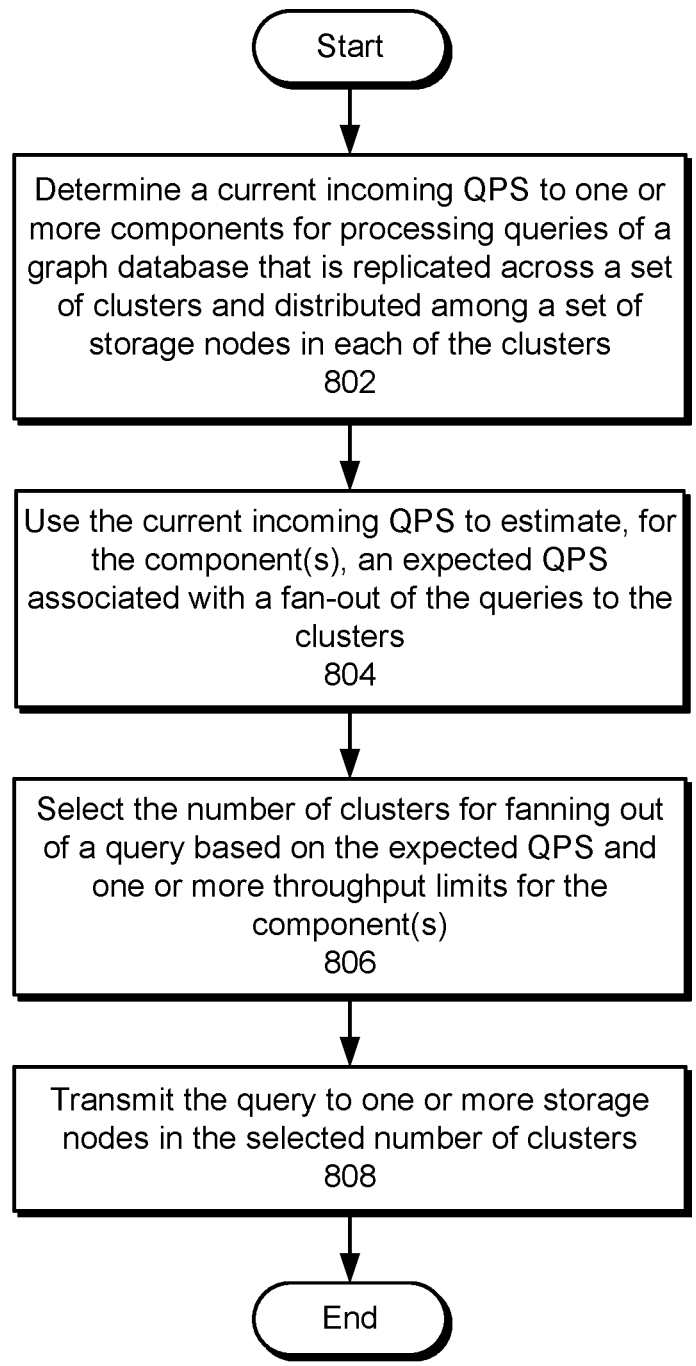
FIG. 8 shows a flowchart illustrating the processing of queries of a graph database in accordance with the disclosed embodiments.

FIG. 8 shows a flowchart illustrating the processing of queries of a graph database in accordance with the disclosed embodiments. In particular, FIG. 8 shows a flowchart of applying throughput-based fan-out control to a query of a scalable distributed data store. In one or more embodiments, one or more of the steps may be omitted, repeated, and/or performed in a different order. Accordingly, the specific arrangement of steps shown in FIG. 8 should not be construed as limiting the scope of the technique.

First, a current incoming QPS to one or more components for processing queries of a graph database that is replicated across a set of clusters and distributed among a set of storage nodes in each of the clusters is determined (operation 802). For example, the current incoming QPS may represent the current rate or volume of queries to a client node that processes queries of the graph database and/or a storage node that processes requests for data from the client node.

Next, the current incoming QPS is used to estimate, for the component(s), an expected QPS associated with a fan-out of the queries to the clusters (operation 804). For example, the expected outgoing QPS for the client may be estimated by multiplying the current incoming QPS by a candidate number of clusters for fanning out of and the number of storage nodes in each of the clusters. In another example, the expected incoming QPS to a storage node may be estimated by multiplying the current incoming QPS by the number of instances of the client node.

The number of clusters for fanning out of a query is then selected based on the expected QPS and one or more throughput limits for the component(s) (operation 806). For example, the number of clusters may be selected to not exceed the throughput limit of the client node divided by a product of the number of storage nodes and the current incoming QPS. The number of clusters may additionally or instead be selected to not exceed the throughput limit of the storage node divided by a product of the number of instances of the client node and the current incoming QPS. In other words, the number of clusters may be limited to a value that does not cause the expected QPS to exceed the throughput limit(s). Finally, the queries are transmitted to one or more storage nodes in the selected number of clusters (operation 808), as described above.

Figure 9:
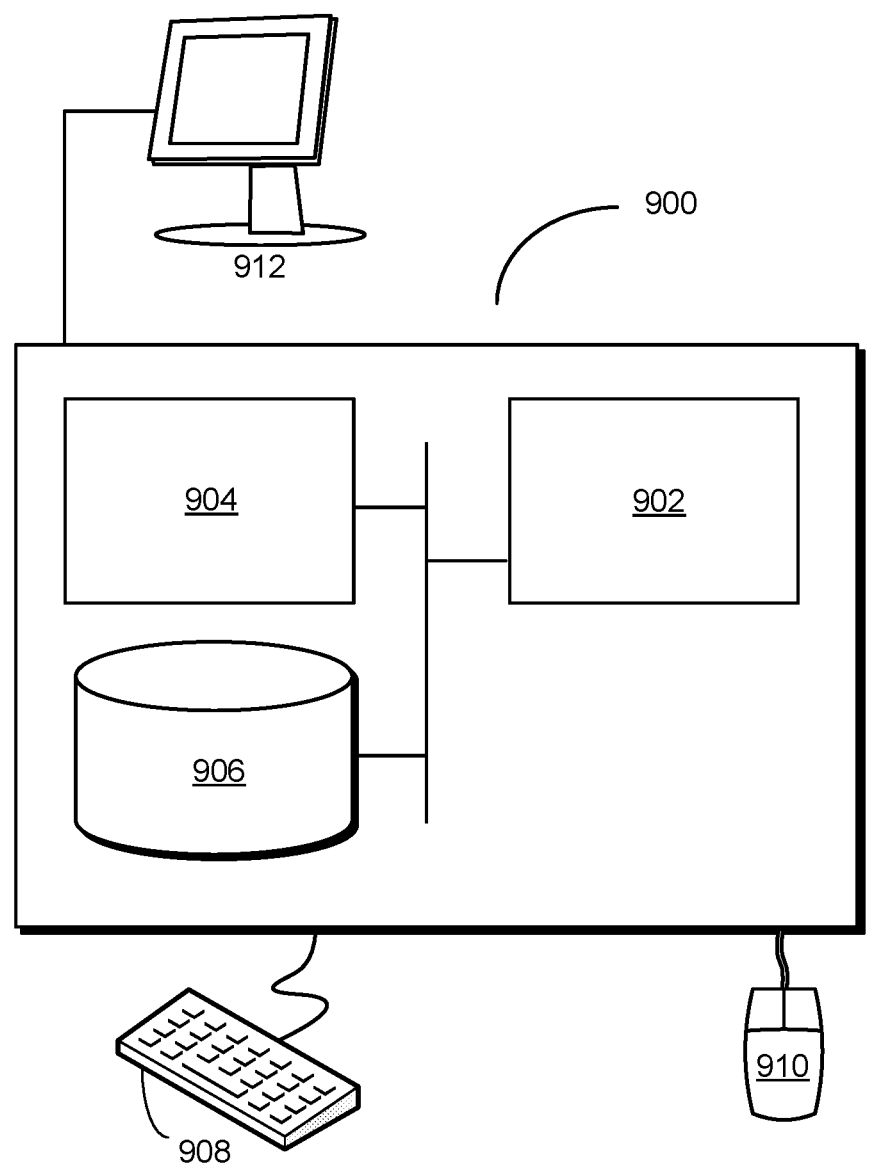
FIG. 9 shows a computer system in accordance with the disclosed embodiments.

FIG. 9 shows a computer system 900 in accordance with an embodiment. Computer system 900 may correspond to an apparatus that includes a processor 902, memory 904, storage 906, and/or other components found in electronic computing devices. Processor 902 may support parallel processing and/or multi-threaded operation with other processors in computer system 900. Computer system 900 may also include input/output (I/O) devices such as a keyboard 908, a mouse 910, and a display 912.

Computer system 900 may include functionality to execute various components of the present embodiments. In particular, computer system 900 may include an operating system (not shown) that coordinates the use of hardware and software resources on computer system 900, as well as one or more applications that perform specialized tasks for the user. To perform tasks for the user, applications may obtain the use of hardware resources on computer system 900 from the operating system, as well as interact with the user through a hardware and/or software framework provided by the operating system.

In one or more embodiments, computer system 900 provides a system for processing queries of a graph database storing a graph. The system may include a distribution mechanism that generates a first distribution of a set of partitions containing a graph database across a first set of storage nodes in a first cluster. The distribution mechanism may also replicate the graph database by generating a second, different distribution of the set of partitions across a second set of storage nodes in a second cluster. The system may also include a query processor in a client node that processes the query by identifying one or more partitions storing data associated with the query, using a set of mappings containing the set of partitions, the first and second sets of storage nodes, and the first and second clusters to select one or more storage nodes containing the one or more partitions, and transmitting one or more portions of the query to the selected storage nodes.

The client node may also include a load balancer and one or more fan-out controllers. The query processor may identify a query type of the query, and the fan-out controller(s) may determine, based on the query type, a number of clusters for fanning out of the query. The load balancer may then select a set of storage nodes in the determined number of clusters for processing of the query and generate a fan-out of the query to the selected nodes.

The client node may additionally obtain a current incoming QPS to one or more components for processing the queries and use the current incoming QPS to estimate, for the component(s), an expected QPS associated with a fan-out of the queries to a number of clusters. The client node may then select the number of clusters for fanning out of the queries based on the expected QPS and one or more throughput limits for the component(s) and transmit the queries to one or more of the storage nodes in the selected number of clusters.

In addition, one or more components of computer system 900 may be remotely located and connected to the other components over a network. Portions of the present embodiments (e.g., client node, mapping apparatus, clusters, storage nodes, partitions, etc.) may also be located on different nodes of a distributed system that implements the embodiments. For example, the present embodiments may be implemented using a cloud computing system that processes queries of a distributed graph database from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    determining a current incoming queries per second (QPS) to one or more components for processing queries of a graph database, wherein the graph database is replicated across multiple clusters and distributed among a set of storage nodes in each of the clusters;
    using the current incoming QPS to estimate, for the one or more components, an expected QPS associated with fanning out of the queries to the clusters; and
    when a query of the graph database is received, processing the query on a computer system by:
        selecting a number of clusters in the multiple clusters for fanning out of the query, based on the expected QPS and one or more throughput limits for the one or more components; and
        transmitting the query to one or more storage nodes in the selected number of clusters.

2. The method of claim 1, wherein the one or more components comprise:
    a client node that receives incoming queries to the graph database; and
    a storage node in the set of storage nodes.

3. The method of claim 2, wherein using the current incoming QPS to estimate the expected QPS for the client node comprises:
    multiplying the current incoming QPS to the client node by a candidate number of clusters for fanning out of the query and a number of storage nodes in each of the clusters to obtain an expected outgoing QPS from the client node.

4. The method of claim 3, wherein selecting the number of clusters for fanning out of the query based on the expected QPS and the one or more throughput limits comprises:
    selecting the number of clusters to not exceed a product of a throughput limit of the client node and the candidate number of clusters divided by the expected outgoing QPS from the client node.

5. The method of claim 2, wherein using the current incoming QPS to estimate the expected QPS for the storage node comprises:
    multiplying the current incoming QPS to the client node by a number of instances of the client node to obtain an expected incoming QPS to the storage node.

6. The method of claim 5, wherein selecting the number of clusters for fanning out of the query based on the expected QPS and the one or more throughput limits comprises:
    selecting the number of clusters to not exceed a product of a throughput limit of the storage node and a candidate number of clusters for fanning out of the query divided by a product of the number of instances of the client node and the current incoming QPS to the client node.

7. The method of claim 2, wherein the client node comprises at least one of:
    a query processor; and
    a caching service.

8. The method of claim 1, wherein selecting the number of clusters for fanning out of the query based on the expected QPS and the one or more throughput limits comprises:
    limiting the selected number of clusters to a value that does not cause the expected QPS to exceed the one or more throughput limits.

9. The method of claim 1, further comprising:
    selecting the number of clusters for fanning out of the query based on a query type of the query.

10. The method of claim 1, wherein the graph database comprises a set of partitions in a first distribution across the storage nodes in a first cluster and a second distribution that is different from the first distribution across the storage nodes in a second cluster.

11. The method of claim 1, wherein transmitting the query to the one or more storage nodes in the selected number of clusters comprises:
    randomly selecting the determined number of clusters as a subset of the multiple clusters;
    identifying a partition of the graph database storing data associated with a key in the query;
    selecting a cluster from the subset of clusters;
    identifying a storage node containing the partition in the selected cluster; and
    transmitting a portion of the query comprising the key to the identified storage node.

12. An apparatus, comprising:
    one or more processors; and
    memory storing instructions that, when executed by the one or more processors, cause the apparatus to:

determine a current incoming queries per second (QPS) to one or more components for processing queries of a graph database, wherein the graph database is replicated across multiple clusters and distributed among a set of storage nodes in each of the clusters;

use the current incoming QPS to estimate, for the one or more components, an expected QPS associated with fanning out of the queries to the clusters;

select a number of clusters in the multiple clusters for fanning out of a query based on the expected QPS and one or more throughput limits for the one or more components; and transmit the query to one or more of the storage nodes in the selected number of clusters.

13. The apparatus of claim 12, wherein the one or more components comprise:

a client node that receives incoming queries to the graph database; and a storage node in the set of storage nodes.

14. The apparatus of claim 13, wherein using the current incoming QPS to estimate the expected QPS for the client node comprises:

multiplying the current incoming QPS to the client node by a candidate number of clusters for fanning out of the query and a number of storage nodes in each of the clusters to obtain an expected outgoing QPS from the client node.

15. The apparatus of claim 14, wherein selecting the number of clusters for fanning out of the query based on the expected QPS and the one or more throughput limits comprises:

selecting the number of clusters to not exceed a product of a throughput limit of the client node and the candidate number of clusters divided by the expected outgoing QPS from the client node.

16. The apparatus of claim 13, wherein using the current incoming QPS to estimate the expected QPS for the storage node comprises:

multiplying the current incoming QPS to the client node by a number of instances of the client node to obtain an expected incoming QPS to the storage node.

17. The apparatus of claim 16, wherein selecting the number of clusters for fanning out of the query based on the expected QPS and the one or more throughput limits comprises:

selecting the number of clusters to not exceed a product of a throughput limit of the storage node and a candidate number of clusters for fanning out of the query divided by a product of the number of instances of the client node and the current incoming QPS to the client node.

18. The apparatus of claim 12, wherein selecting the number of clusters for fanning out of the query based on the expected QPS and the one or more throughput limits comprises:

limiting the selected number of clusters to a value that does not cause the expected QPS to exceed the one or more throughput limits.

19. A system, comprising:

a measurement mechanism comprising a non-transitory computer-readable medium comprising instructions that, when executed, cause the system to determine a current incoming queries per second (QPS) to one or more components for processing queries of a graph database, wherein the graph database is replicated across multiple clusters and distributed among a set of storage nodes in each of the clusters; and a client node comprising a non-transitory computer-readable medium comprising instructions that, when executed, cause the system to:

use the current incoming QPS to estimate, for the one or more components, an expected QPS associated with fanning out of the queries to the clusters;

select a number of clusters in the multiple clusters for fanning out of a query based on the expected QPS and one or more throughput limits for the one or more components; and transmit the query to one or more of the storage nodes in the selected number of clusters.

20. The system of claim 19, wherein selecting the number of clusters for fanning out of the query based on the expected QPS and the one or more throughput limits comprises:

limiting the selected number of clusters to a value that does not cause the expected QPS to exceed the one or more throughput limits.

* * * * *

UNITED STATES PATENT AND TRADEMARK OFFICE
CERTIFICATE OF CORRECTION

PATENT NO. : 10,037,376 B2  
APPLICATION NO. : 15/096067  
DATED : July 31, 2018  
INVENTOR(S) : SunJu Cho et al.

Page 1 of 1

It is certified that error appears in the above-identified patent and that said Letters Patent is hereby corrected as shown below:

On the Title Page

Item (71) (Applicant), please delete the word "LinkedIn" and replace it with the word --LinkedIn--.

In the Specification

At Column 1, Lines 23 and 24, please delete the words "TO BE ASSIGNED", and replace it with the words --15/096,068-- and please delete the words "TO BE ASSIGNED", and replace with the words --11 April 2016--.

At Column 1, Lines 30 and 31, please delete the words "TO BE ASSIGNED", and replace it with the words --15/096,070-- and please delete the words "TO BE ASSIGNED", and replace with the words --11 April 2016--.

Signed and Sealed this  
Eighteenth Day of September, 2018

Andrei Iancu  
*Director of the United States Patent and Trademark Office*